May 13, 1941. C. U. GRAMELSPACHER 2,241,593
ONE-PIECE TIRE
Filed Oct. 24, 1939
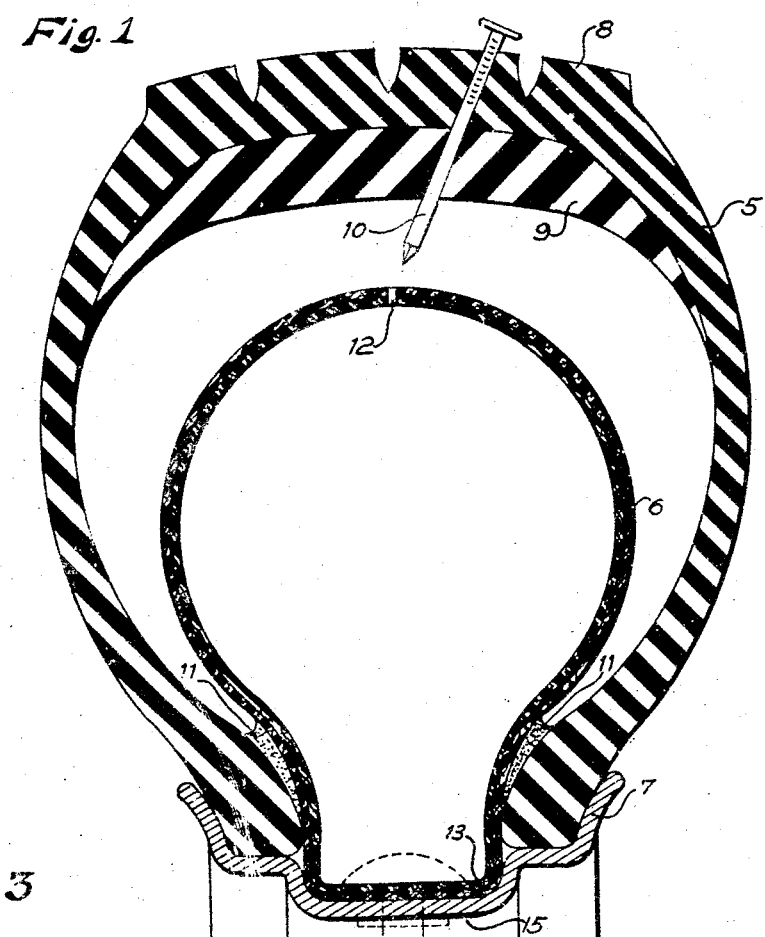
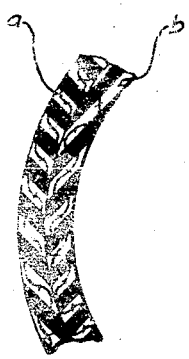
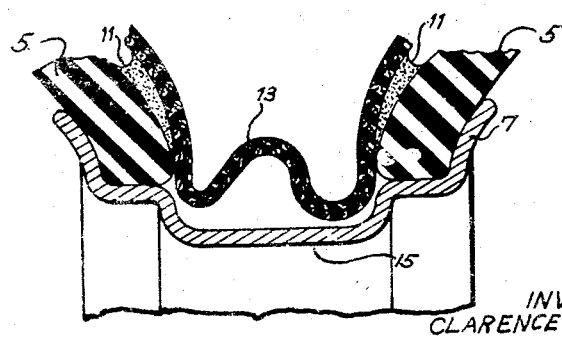
INVENTOR
CLARENCE U. GRAMELSPACHER
BY Toulmin & Toulmin
ATTORNEYS Patented May 13, 1941

2,241,593

UNITED STATES PATENT OFFICE 2,241,593

ONE-PIECE TIRE

Clarence U. Gramelspacher, Jasper, Ind.

Application October 24, 1939, Serial No. 301,015

5 Claims. (Cl. 152—342)

My invention relates to pneumatic tires, and more particularly to an improved puncture-proof tire construction which is adapted for use on automobiles, motorcycles, aircraft and similar vehicles.

It is an object of this invention to provide a tire which is of one-piece construction, efficient in operation and is inexpensive to manufacture.

Another object is to provide a pneumatic tire which is self-sealing when the tire is fractured or pierced with an object.

Another object is to devise an improved tire which combines the features of a slow-leak inner tube and a self-sealing outer casing. To this end a slow-leak inner tube member is sealed within the casing and the casing is constructed with an inner soft rubber wall section adjacent the tire-tread surface.

Another object is to provide an improved pneumatic tire having outer and inner concentric tubular wall portions which are sealed together to form air chambers providing a unitary tire structure.

These and other objects and advantages will be apparent during the course of the following description.

In the accompanying drawing forming a part of this specification:

Figure 1 is a cross sectional view of a tire constructed according to my invention, and the parts are shown in their relative position in which they would be when the tire is inflated;

Figure 2 is a fragmentary detail sectional view taken through the tire and rim portion showing the flexing of the tire parts when the same is deflated;

Figure 3 is an enlarged detail view of a portion of the wall forming the inner tube showing the fabric layer construction.

Referring to the drawing in detail, the tire comprises an outer casing 5 and an attached inner tube member 6 which is adapted to fit on a conventional rim means 7, as shown in Figure 1. The tire comprises the casing and inner tube which are united together to form a unitary single tire construction. The casing 5 is provided with the usual thickened outer tread portion 8. Arranged along the inner wall of the casing adjacent the tread and side wall portion is an inner lining wall 9 comprising soft rubber. This inner lining wall is of sufficient thickness to provide for sealing of the aperture made by an object piercing the casing inner wall, and is made of soft vulcanized rubber mass similar to that conventionally utilized in making printers' rollers. Other soft rubber compounds made from natural or synthetic rubber or similar resilient plastic material may be used.

The plastic wall section 9 is fabricated so that it will possess sufficient resiliency and softness to expand or flow together in order to close the opening made by an object, such as a nail or the like, as shown at 10 in Figure 1, when the same is withdrawn from the tire. In this way, when an object which has pierced the outer casing causing deflation of the tire has been removed, the aperture made by the object is automatically sealed whereby the tire can be re-inflated to the proper pressure and again put in service without necessitating the removing of the tire from the rim for vulcanization or repair.

The inner tube 6 preferably comprises substantially non-stretchable tubing made of two layers of rubberized fabric $a$ and $b$; the tubing being suitably glued to the side walls of the tire casing adjacent the outer walls of the rim 7, at 11, as shown in Figure 1. For this purpose a suitable rubber cement is employed. For providing a slow leak in the wall of the inner tube 6 there is provided an aperture 12 which preferably is made in the wall of the inner tube adjacent the soft rubber portion 9. One or more of these apertures may be formed in the wall if desired, and the inner tube may comprise one or more fabric layers, such as shown at Figure 3. At one point along the inner tube wall 13 there is attached a valve member 14 which is adapted to be inserted through an opening in the central wall 15 of the rim 7 in the conventional manner. When the tire is inflated, as shown in Figure 1, the inner tube 6 is adapted to fit snugly in the depressed wall portion 16 of the rim. When the tire is deflated the wall portion 13 of the inner tube is flexed together so as to permit the removal of the tire from the rim. When air under pressure is forced through the valve stem it enters into the inner chamber formed by the inner tube 6 and passes out through the opening 12 into the space between the casing 5 and the tube 6. In case there is a puncture which is not sealed the air will escape gradually from the casing so that the vehicle can be safely brought to a stop.

It will be understood that this invention is not to be limited to the particular details of construction other than as restricted by the appended claims and that various changes may be made to accommodate different conditions and uses without departing from the spirit of my invention.

Having thus fully described my invention, what

I claim as new and desire to secure by Letters Patent is:

1. A pneumatic tire construction comprising a casing, a tread on the outer peripheral surface of said casing, an inner soft plastic rubber section forming a portion of the innermost wall of said casing, an inner tube of smaller diameter than said casing dividing the tire into two air chambers, said inner tube having a slow-leak aperture in the outermost wall section, opposite to and spaced from said plastic rubber section said aperture being closed by said soft plastic rubber upon puncturing said tire and distortion of the casing against said inner tube.

2. A pneumatic tire construction comprising a casing, a tread on the outer surface of said casing, an inner soft plastic adhesive section forming a portion of the innermost wall of said casing, and an inner tube of smaller diameter than said casing attached to said casing dividing the tire into two air chambers, said inner tube having a slow-leak aperture in the outermost wall section disposed opposite and spaced from the inner soft plastic adhesive section of the casing, said aperture being closed by said soft plastic rubber upon deflation of said casing and movement of said plastic inner wall in contact with said slow-leak aperture.

3. A pneumatic tire construction comprising a casing having a tread on the outer surface, an inner tubular member of smaller diameter attached to said casing and dividing the tire into two air chambers, said inner tubular member comprising a slow-leak aperture for interconnecting said chambers, and a valve attached to said inner tubular member through which air is introduced into the tire, said casing comprising an innermost wall portion beneath the tread of soft plastic rubber providing a self-sealing section, said slow-leak aperture being positioned opposite said soft plastic rubber portion whereby upon puncturing of said tire casing plastic rubber is brought in contact with said slow-leak aperture substantially closing the same.

4. A pneumatic tire construction comprising an outer casing having a tread surface, said outer casing comprising an inner plastic wall section arranged adjacent said tread and extending along at least a portion of the side walls of said tire casing, an inner tubular member comprising rubberized fabric having a valve through which air is introduced, said inner tubular member dividing the tire into two separate air chambers, and a slow-leak aperture in the outermost wall portion of said inner tubular member for passing air into the chamber formed by said outer casing, said aperture being substantially closed upon distortion of said casing so as to bring the inner plastic wall portion against said slow-leak aperture, said outer casing member being hermetically sealed circumferentially to the outer side walls of said inner tubular member and forming a unitary tire structure.

5. A pneumatic tire construction comprising an outer casing having a tread, said casing having an inner soft plastic rubber section forming an integral backing wall for said tread and side wall portions adjacent said tread, an inner tubular member formed of rubberized fabric hermetically sealed to the side walls of said casing adjacent the central circumferential opening in the casing and dividing the tire into two separate air chambers, and valve means for admitting air to the inner tubular member, said inner tubular member comprising a slow-leak aperture in the outermost wall portion for providing slow leakage of air into the chamber formed between said outer casing and said inner tubular member, said slow-leak aperture being contacted by said soft plastic rubber casing wall section upon the puncturing of said tire casing.

CLARENCE U. GRAMELSPACHER.